United States Patent [19]

Invernizzi et al.

[11] Patent Number: 4,843,049

[45] Date of Patent: Jun. 27, 1989

[54] CATALYST COMPONENT FOR POLYMERIZING ETHYLENE OR COPOLYMERIZING ETHYLENE WITH AN ALPHA-OLEFIN

[76] Inventors: Renzo Invernizzi, Via Primaticcio, 98, 20147 Milano; Francesco Masi, Via Kennedy, 36, 20097 San Donato Milanese (Milano); Angelo Moalli, Via del Cantiere, 1, 28053 Castelletto Ticino, all of Italy

[21] Appl. No.: 150,744

[22] Filed: Feb. 1, 1988

[30] Foreign Application Priority Data

Jun. 2, 1987 [IT] Italy ............... 19276 A/87

[51] Int. Cl.$^4$ ............................................. C08F 4/64
[52] U.S. Cl. ........................................... 502/9; 502/111; 502/125; 526/125
[58] Field of Search ..................... 502/9, 111, 125

[56] References Cited

U.S. PATENT DOCUMENTS

| | | | |
|---|---|---|---|
| 3,135,809 | 6/1964 | Bosmajian | 502/114 X |
| 4,376,062 | 3/1983 | Hamer et al. | 502/9 |
| 4,421,674 | 12/1983 | Invernizzi et al. | 502/9 |
| 4,506,027 | 3/1985 | Invernizzi et al. | 502/9 |
| 4,506,029 | 3/1985 | Band | 502/111 |

*Primary Examiner*—Patrick P. Garvin
*Attorney, Agent, or Firm*—Hedman, Gibson, Costigan & Hoare

[57] ABSTRACT

A catalyst component is in the form of a granular spherical solid with at least 80% of the granules between 30 and 40 microns in size, a service area of 15 to 30 m$^2$/g and a porosity of 40 to 80 volumes % and definable (in atomic proportions) by the formula:

$$Ti_1Mg_{0.3-3.1}Al_{0.4-0.65}Cl_{3.2-8.2}$$

$$(Et + OEt + OR')_{1.9-3}$$

where Et denotes the ethyl group; OEt denotes the ethoxy group and OR' is an alkoxy group containing from 1 to 8 carbon atoms in the alkyl portion, and in which the ratio of trivalent titanium to the sum of trivalent and tetravelent titanium is in the range from 0.8/1 to 1/1.

The solid catalyst component is obtained by:
(a) Spray-drying a solution of magnesium chloride in ethanol to produce a solid substrate in the form of spherical granules containing alcoholic hydroxyl groups, and
(b) Suspending the solid substrate in an inert liquid and contacting and reacting the resulting suspension firstly with measured quantities of a titanium tetraalkoxide and then with measured quantities of diethyl aluminium chloride or ethyl aluminium sesquichloride.

The solid catalyst component is used in combination with a trialkyl aluminium to polymerize ethylene or to copolymerize ethylene with an alpha-olefin, more particularly by the suspension technique.

15 Claims, No Drawings

CATALYST COMPONENT FOR POLYMERIZING ETHYLENE OR COPOLYMERIZING ETHYLENE WITH AN ALPHA-OLEFIN

FIELD OF THE INVENTION

The invention relates to a solid catalyst component, the method of preparing, it, and its use in methods of polymerizing ethylene or copolymerizing ethylene with an alpha-olefin.

BACKGROUND OF THE INVENTION

As is known, ethylene or in general alpha-olefins can be polymerized by the Ziegler low-pressure method.

To this end, use is made of catalysts generally comprising a compound of elements in groups IV to VI in the periodic system (compounds of transition metals) mixed with an organometallic compound or hydride of elements in groups I to III of the periodic system, operating in suspension or in solution or in the gas phase.

In other known catalysts, the transition metal component is fixed on an organic or inorganic solid substrate, and physically and/or chemically treated if required. The following are examples of solid substrates: oxygenated compounds of divalent metals (e.g. oxides or oxygenated or carboxylated inorganic salts) or hydroxychlorides or chlorides of divalent metals.

One particular substrate for the transition metal compound is the solid free-flowing product obtained by spray-drying a solution of magnesium chloride in ethanol as described e.g. in U.S. Pat. Nos. 4,421,674 and 4,481,342. The resulting substrates, which have a certain content of alcoholic hydroxyls, react esily with titanium tetrachloride to give solid catalyst compounds having high activity in the polymerization of ethylene and the copolymerization of ethylene with an alpha-olefin.

One characteristic of the catalyst components described hereinbefore is the relatively low content of titanium, typically of the order of 5% by weight expressed as metal. It is therefore desirable to provide catalyst components having a titanium content which is higher and in active form, so as to obtain improved performances in the polymerization of ethylene or the copolymerization of ethylene with alpha-olefins.

In industry, a need has also been felt for catalysts capable of producing ethylene polymers or ethylene copolymers with alpha-olefins having restricted distributions of molecular weights and a desirable group of characteristics with regard to the melt index and shear sensitivity and an extremely low content of fines. These ethylene polymers are particularly suitable for injection-moulding.

It has now been found that these requirements can be met by the catalyst component and the catalyst according to the invention.

SUMMARY OF THE INVENTION

More particularly the catalyst component according to the invention is in the form of a spherical granular solid in which at least 80% of the granules are between 30 and 40 microns in size, have a surface area of 15 to 30 m$^2$/g and a porosity of 40 to 80 volume %, the component being definable by the following formula (in atomic proportions):

$$Ti_1 Mg_{0.3-3.1} Al_{0.4-0.65} Cl_{3.2-8.2}$$

-continued $$(Et + OEt + OR')_{1.9-3}$$

where Et denotes the ethyl group; OEt denotes the ethoxy group and OR' denotes an alkoxy group containing from 1 to 8 carbon atoms in the straight-chain or branched alkyl portion, and in which the ratio of trivalent titanium to the sum of trivalent and tetravalent titanium is in the range from 0.8/1 to 1/1.

DETAILED DESCRIPTION OF THE INVENTION

In the preferred embodiment, the solid catalyst component has a surface area of the order of 20–30 m$^2$/g, a porosity of the order of 60–70 volume % and is definable (in atomic proportion) by the following formula:

$$Ti_1 Mg_{0.95-1.5} Al_{0.42-0.46} Cl_{3.9-4.9}$$

$$(Et + OEt + OR')_{1.9-2.3}$$

where Et and OEt have the meanings given in claim 1 and OR' deno tes the n-butoxy group: the ratio of trivalent titanium to the sum of trivalent and tetravalent titanium varies from 0.9/1 to 1/1.

Furthermore, in the organic portion of the solid catalyst component (Et+OEt+OR'), the alkoxy components are present in the following preferred proportions: OEt=5−10% and OR'=20−30% by weight with respect to the solid catalyst component.

The solid catalyst component according to the invention is obtained as follows:

(a) An ethanolic solution of magnesium chloride is spray-dried to form a solid granular spherical free-flowing substrate containing from 18 to 25% by weight of alcoholic hydroxyls expressed as ethanol:

(b) The substrate is suspended in an inert liquid and the suspension is placed in contact and reacted firstly: with a titanium tetra-alkoxide Ti(OR')$_4$ where R' denotes a straight-chain or branched alkyl group containing from 1 to 8 carbon atoms, operating at a temperature between room temperature (20°–25° centigrade) and 90° centigrade and with an atomic ratio of magnesium in magnesium chloride to titanium in the titanium tetra-alkoxide of 0.5/1 to 3/1, and secondly with diethyl aluminum chloride or with ethyl aluminium sesquichloride, operating at a temperature between room temperature (20°–25° centigrade) and 80° centigrade, the ratio of chlorine atoms in diethyl aluminium chloride or ethyl aluminium sesquichloride to alkoxy groups derived from the titanium tetraalkoxide and ethanol being in the range from 0.5/1 to 1.5/1, to obtain the solid catalyst component in which the ratio of trivalent titanium to the sum of trivalent and tetravalent titanium is in the range from 0.8/1 to 1.1 and (c) The solid catalyst component is recovered from the corresponding suspension.

Stage (a)

The substrate according to the invention is prepared as follows: magnesium chloride (anhydrous or containing small quantities of water—less than about 7% by weight) is dissolved in ethanol and the resulting solution is spray-dried in a spray-drying apparatus. More particularly the solution is sprayed through a nozzle or equivalent device into the evaporation chamber of a spray drier and the resulting liquid particles are placed in contact with a stream of high-purity nitrogen supplied to the evaporation chamber in counter-current or co-current. The operating temperature is typically of the order of 250°-400° centigrade for the gas flow at the inlet and 140°-250° centigrade at the outlet, the temperature difference between the inlet and outlet being at least 40° centigrade.

In one embodiment, an additional liquid compound is added to the ethanolic solution of magnesium chloride. The additional compound has a higher boiling-point at atmospheric pressure than ethanol and is normally chosen from among aliphatic or cycloaliphatic or aromatic hydrocarbons or from among hydroxylated polar organic components or esters.

In all cases, by operating under the conditions described hereinbefore, a granular solid typically having the following characteristics can be obtained from the spray drier:

Shape of particles: spherical, about 80% of the particles being between 30 and 40 microns in size:

Apparent density of particles: from 0.2 to 0.3 g/ml;

Surface area: from 30 to 100 m$^2$/g.

For the purposes according to the invention, it is critical for the alcoholic hydroxyls in the catalyst substrate to be kept in the proportion of 18 to 25% by weight expressed as ethanol, the preferred values being in the range of 23 to 25% by weight.

Stage (b)

According to the invention, the solid substrate obtained as described hereinbefore is suspended in an inert liquid and the resulting suspension is contacted and reacted firstly with measured quantities of a titanium tetra-alkoxide and then with measured quantities of diethyl aluminium chloride or ethyl aluminium sesquichloride.

More particularly, to this end, the solid substrate is suspended in an inert liquid, more particularly a hydrocarbon such as n-decane and a titanium tetra-alkoxide, diluted in the same inert liquid if required, is added to the suspension. The preferred titanium tetra-alkoxide is titanium tetra n-butoxide. The reaction can be brought about in a temperature range between ambient temperature (20°-25° centigrade) and 90° centigrade, the preferred temperatures being from 30° to 60° centigrade. The corresponding reaction times are usually in the range of 30 to 120 minutes.

It is critical, for the purposes of the invention, to keep the atomic ratio between the magnesium in magnesium chloride and the titanium in titanium tetra-alkoxide at values between 0.5/1 and 3/1, the preferred values being in the range from 0.8/1 to 1.5/1.

According to the invention, the resulting suspension, after treatment with the titanium tetra-alkoxide, is mixed with diethyl aluminium chloride or ethyl aluminium sesquichloride, diluted if required in the same inert liquid as used for the suspension. The reaction can be brought about at temperatures between ambient temperature (20°-25° centigrade) and 80° centigrade, the preferred values being 30° to 60° centigrade. The reaction is continued until, in the solid catalyst component, the ratio of trivalent titanium to the sum of trivalent and tetravalent titanium is in the range from 0.8/1 to 1/1 and preferably from 0.9/1 to 1/1.

The required times depend mainly on the operating temperature and usually vary from 30 to 120 minutes.

At this stage of preparing the solid catalyst component it is critical to operate with a ratio of chlorine atoms in diethyl aluminium chloride or ethyl aluminium sesquichloride to alkoxy groups derived from titanium tetra-alkoxide or ethanol in the range from 0.5/1 to 1.5/1, the preferred values being in the range from 0.65/1 to 0.8/1.

It has also been found that it is critical for the reagents used to be diethyl aluminium chloride or ethyl aluminium sesquichloride, since other alkyl aluminium chlorides (e.g. ethyl aluminium dichloride) do not give satisfactory results.

Operation as described yields the solid catalyst component according to the invention and having the composition and characteristics as previously stated.

The catalyst according to the invention comprises the solid catalyst component and a tri-alkyl aluminium in which the alkyl group contains from 2 to 6 carbon atoms.

The preferred tri-alkyl aluminium is triethyl aluminum.

Normally in the catalyst the molar ratio between aluminium in the trialkyl aluminium and titanium in the solid catalyst component is kept between 50/1 and 200/1, with preferred values of the order of 100/1.

A catalyst of this kind is highly active in the process for polymerizing ethylene or copolymerizing ethylene with an alpha-olefin containing 3 to 8 carbon atoms, e.g. propylene or 1-butene.

Polymerization is generally brought about by the suspension technique, at a temperature of 75° to 95° centigrade in the presence of a hydrogen moderator.

The catalyst according to the invention has been found particularly useful in the polymerization of ethylene to ethylene polymers with a restricted range of molecular weight and suitable for injection-moulding.

More particularly it has been found, at least when operating with the preferred catalysts, that a polyethylene can be obtained having a desired group of characteristics with regard to the melt index, ASTM-D 1238 (from 6 to 10 g/10$^3$) the shear sensitivity, ASTM D 1238 (from 26 to 27.5) and the ratio between the ponderal and numerical average molecular weight (Mw/Mn from 3.5 to 4.8), the result being a polymer in granular free-flowing form, with an apparent density of 0.32-0.41 g/ml and a very low content of fines (below about 1%).

The polymerization conditions for producing the ethylene polymer are: operatiing in a suspension, temperature of the order of 90° centigrade, total pressure of the order of 9–10 atm., and about 40% in mols of hydrogen in the gas phase.

The following experimental examples non-limitatively illustrate the scope of the invention.

More particularly, Examples 1, 2, 3, 6 and 7 were worked as per the invention. The other examples are given by way of comparison, more particularly to show the critical nature of the parameters referred to previously.

EXAMPLE 1

Preparation of the substrate 33 kg of commercial MgCl$_2$, having a water content of about 0.07% by weight and in the form of flakes between 0.1 and 2 mm in diameter, were dispersed in 100 liters of heptane and 55 kg of ethanol were added to the resulting suspension, the mixture being kept agitated in a steel autoclave. It was heated with agitation to 130° centigrade under nitrogen pressure, giving a uniform emulsion which was supplied at the last-mentioned temperature to a CLOSE CYCLE DRYER, an industrial drying device produced by the Company NIRO.

The emulsion in the aforementioned device was reduced to finely-divided liquid particles by using a hydraulic nozzle having a 0.7 mm bore and a spray cone angle of 60°. The supply pressure was 7 kg/cm² and the flow rate per hour was 15 liters of emulsion. During operation, the nitrogen temperature at the inlet was 250° centigrade and the gas flow at the outlet was at 160° centigrade, the nitrogen flow rate being about 200 m³/h, evaluated under normal conditions.

As a result of operating under these conditions, a granular solid having the following characteristics was recovered from the bottom of the reactor:

Shape of particles: spherical, 80% of the particles being between 30 and 40 microns in size;
Apparent density of particles: 0.28 g/ml;
Content of alcoholic hydroxyls: 25% by weight expressed as ethanol:
Surface area: 32 m²/g;
Porosity: 55% by volume.

Preparation of the catalyst component 2.45 g of the substrate obtained as described hereinbefore were suspended in 50 ml of n-decane in an agitated 250-ml reactor. 7 g of titanium tetra n-butylate (Mg/Ti atomic ratio 1/1) were added and the suspension was heated to 80° centigrade for 60 minutes. After this time the mixture was cooled to 30° centigrade by gradual dropwise addition of 8.3 g of diethyl aluminium chloride (ratio of chlorine atoms in diethyl aluminium chloride to alkoxy groups (OEt+OBu)=0.75/1) diluted in 35 g n-decane. At the end of the addition process, the suspension was heated to 60° centigrade for 30 minutes and then the solid was filtered on a sintered glass baffle. This yielded 8 g of the solid catalyst component, which was washed with 3 100-ml portions of n-decane.

The solid catalyst component had the following characteristics:

Shape and size of particles: similar to those of the substrate;
Titanium content: 12.5% by weight expressed as metal;
Ratio of trivalent titanium to the sum of trivalent and tetravalent titanium: 0.98/1;
Apparent density: similar to that of the substrate;
Surface area: 30 m²/g;
Porosity: 65% by volume.

The catalyst component contained the following, as a percentage by weight:
Titanium: 12.5; magnesium: 5.8; aluminium: 3.1; chlorine: 35; organic fraction: 43.6.

If the preceding components are expressed in their atomic proportions, the catalyst component can be represented by the following formula:

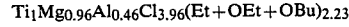

$$Ti_1Mg_{0.96}Al_{0.46}Cl_{3.96}(Et+OEt+OBu)_{2.23}$$

where OEt and OBu are present in quantities equal to 5.8% and 29% by weight of the catalyst component.

Polymerization of ethylene

The following were introduced into an agitated 5-liter reactor in the following order: 1820 ml of anhydrous n-heptane, 0.68 g triethyl aluminium and 32 mg of the solid catalyst component prepared as previously described.

The reactor temperature was brought to 90° centigrade and pressurized with hydrogen at 3.8 atm. Ethylene was supplied until the pressure was 9 atm, which pressure was maintained for four subsequent hours by continuously supplying ethylene. At the end of this period, polymerization was stopped by introducing 20 ml of a 10% by weight alcoholic solution of IONOLO into the reactor.

The resulting polythene had the following values:
Productivity: 22, expressed as kg of polyethylene per g of solid catalyst component;
Yield: 180, expressed as kg polyethylene per g of titanium in the solid catalyst component.

The resulting polyethylene had the following characteristics:

| | | |
|---|---|---|
| Melt index | ASTM-D 1238 | 7.8 g/10¹ |
| Shear sensitivity | ASTM-D 1238 | 26 |
| Ratio of average molecular weight (ponderal) to average molecular weight (numberical): Mw/Mn = 3.8 | | |
| Density: | ASTM-D 2839 | 0.962 g/ml |

Physical form of polymer: free-flowing granules, average diameter 300–350μ
Apparent density: 0.38 g/ml
Content of fines (<74μ) 0.3% by weight
Fraction extractable in boiling n-heptane: 2% by weight.

EXAMPLE 2

7.4 kg of the support prepared as described in Example 1 were suspended in 150 l of n-decane in an agitated 300-liter reactor 21 kg of titanium tetra n-butylate were added and the suspension was heated to 50° centigrade for 30 minutes. After cooling to ambient temperature, 26.5 kg of diethyl aluminium chloride were slowly added in a period of about 60 minutes, followed by heating to 50° centigrade for 60 minutes, after which the suspension was cooled and 22 kg of solid catalyst component were filtered and washed in about 500 l of n-decane.

The catalyst component contained the following, as a percentage by weight:
Titanium: 12.4; magnesium: 6.8; aluminium: 2.8; chlorine: 40.3; organic fraction: 37.6.

The catalyst component can therefore be represented by the following formula:

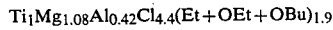

$$Ti_1Mg_{1.08}Al_{0.42}Cl_{4.4}(Et+OEt+OBu)_{1.9}$$

where OEt and OBu are present in proportions of 6.0% and 25% by weight of the catalyst component.

The other characteristics were similar to those of the solid catalyst component in Example 1. Ethylene was polymerized by using two reactors, each of 40 m³, in series.

The operating conditions were as follows:
Ethylene supply: 2 400 kg/h per reactor
Temperature of reactors: 90±1° C.
Total pressure in reactors: 10±0.5 atm.
Cloudy concentration in reactors: 400 g/l
Hydrogen circulated in reactors: 40–41% by volume
Ratio of ethylene to hydrogen: 1:1–1.1:1
Flow rate of fresh make-up heptane: 1000 kg/h per reactor
Supply of solid catalyst component (non-diluted): 90 g/h per reactor Supply of triethyl aluminum (non-diluted): 0.6 kg/h per reactor
Flow rate of recycled heptane: 3500 kg/h per reactor
Residence time: about 5 hours When operating under the aforementioned conditions, the productivity values were 27 and the yield was 220, expressed as in Example 1.

The resulting polyethylene had the following characteristics:
Melt index 6–7 g/10$^3$
Shear sensitivity 26.5–27.5
Density 0.9616–0.9618 g/ml
Physical form of polymer: free-flowing granules, average diameter 360$\mu$
Apparent density: 0.38–0.40 g/ml
Content of fines: (<74$\mu$) 1% by weight
IZOD (Resilience): 10–11.5 kg cm/cm$^2$
(ASTM D 256): (about 90 Joule/m)
GPC data as follows:
Mw.10$^{-3}$=63—78
Mn.10$^{-3}$=18—16
Mz.10$^{-3}$=156—283
Mw/Mn=3.5—4.8

EXAMPLE 3

245 g of the substrate obtained in Example 1 were suspended in 50 ml of n-decane in an agitated 250-ml reactor. 7 g of titanium tetra n-butylate were added and the suspension was heated to 80° centigrade for 120 minutes. It was then cooled to 50° centigrade and 5.7 g of ethyl aluminum sesquichloride diluted in 30 g n-decane were added dropise. In this example, therefore, the atomic ratio of Mg to Ti was 1/1 and the ratio of chlorine atoms in ethyl aluminium sesquichloride to alkoxy groups was 75/1. The suspension was kept at 50° C. for 20 minutes and the solid was separated by filtration on a sintered glass filter. The solid was washed with three portions of n-decane, each of 100 ml.

8 g of solid catalyst component were obtained with the following characteristics:
Shape and size of particles: similar to those of the substrate;
Content of titanium: 12% by weight expressed as metal;
Ratio between trivalent titanium and the sum of trivalent and tetravalent titanium: 0.85/1:
Surface area: 24 m$^2$/g;
Porosity: 68% by volume.

The catalyst component contained the following as a percentage by weight:
Titanium: 12: magnesium: 8.7; aluminum: 3.1: chlorine: 45; organic fraction 42.

The catalyst component is therefore defined by the following formula:

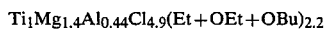
Ti$_1$Mg$_{1.4}$Al$_{0.44}$Cl$_{4.9}$(Et+OEt+OBu)$_{2.2}$ where OEt and OBu are present in the proportions of 8.0% and 22.0% by weight of the catalyst component.

The following were introduced in the following order into an agitated 5-liter reactor 1820 ml of anhydrous n-heptane, 0.68 g triethyl aluminium and 33 mg of the solid catalyst component prepared as described hereinbefore.

The reactor was heated to 90° centrigrade and pressurized with hydrogen at 3.8 atm. Ethylene was supplied until the total pressure was 9 atm, and the same conditions were maintained for four subsequent hours by supplying ethylene.

Polymerization was then stopped by injecting 20 ml of an alcoholic solution of IONOLO into the reactor.

The productivity of the polyethylene was 15.7 and the yield was 130.

The resulting polyethylene had the following characteristics:
Melt index: 6.4 g/10
Shear sensitivity: 26.8
Mw/Mn: 4.0
Density: 0.9620 g/ml
Physical form of polymer: free-flowing granules, average diameter 360$\mu$
Apparent density: 0.32 g/ml
Content of fines (<74$\mu$): 0.3% by weight

EXAMPLE 4 (comparison)

The substrate used was prepared as described in Example 1.

2.45 g of the substrate were suspended in 50 ml n-decane in an agitated 250-ml reactor. 7 g of titanium tetra n-butylate were added to the resulting suspension, which was heated to 80° centigrade for 60 minutes. It was then cooled to 30° centigrade and 4.2 g of ethyl aluminim dichloride diluted in 25 g n-decane were added dropwise. In this example, therefore, the operating atomic ratio of Mg to Ti was 1/1 and the ratio of chlorine atoms in diethyl aluminium dichloride to alkoxy groups was 0.75/1.

The resulting suspension was heated to 80° centigrade for 120 minutes and the solid was then filtered on a sintered glass baffle and washed with three 100-ml portions of n-decane.

The resulting solid catalyst component (about 3 g) had the following characteristics:
Shape and size of particles: heterogeneous powder;
Titanium content: 6.1% by weight, expressed as metal;
Ratio of trivalent titanium to the sum of trivalent and tetravalent titanium: 0.48/1
The catalyst component contained the following, as a percent by weight:
Titanium 6.1; magnesium: 15.9; aluminium: 2.4; chlorine: 48.4; organic fraction: 27.

The catalyst component can be defined by the following formula:

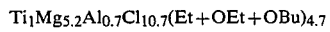
Ti$_1$Mg$_{5.2}$Al$_{0.7}$Cl$_{10.7}$(Et+OEt+OBu)$_{4.7}$

The following were introduced in the following order into an agitated ;b 5-liter reactor: 1820 ml of anhydrous n-heptane, 0.68 g triethyl aluminium and 65.5 g of the solid catalyst component described hereinbefore.

The reactor was brought to a temperature of 90° centrigrade and pressurized with hydrogen to 3.8 atm. and then with ethylene to 9 atm. Ethylene was supplied for 4 hours, keeping the pressure at the stated value, after which the reaction was stopped by injecting 20 ml of an alcoholic solution of IONOLO into the reactor.

The productivity of the polyethylene was 9.6 and the yield was 115.

The resulting polyethylene had the following characteristics:
Melt index: 3.2 g/10
Shear sensitivity: 33
Density: 0.9605 g/ml Physical form of polymer: heterogeneous powder, average diameter 150μ
Apparent density: 0.39 g/ml
Content of fines (<74μ): 12% by weight

EXAMPLE 5 (comparison)

The substrate used was prepared as described in Example 1.

2.45 g of the substrate were suspended in 50 ml n-decane in an agitated 250-ml reactor. 18 g of titanium tetra n-butylate were added and heated to 80° centrigrade for 60 minutes. After cooling to 40° centigrade, 13.2 g of ethyl aluminium sesquichloride diluted in 50 g n-decane were added dropwise. In this example, therefore, the Mg/Ti ratio was 0.4/1 and the ratio of chlorine atoms in ethyl aluminium sesquichloride to alkoxy groups was 0.75/1. The suspension was heated to 60° centrigrade for 120 minutes, the solid was filtered on a sintered glass baffle and the resulting solid was washed with three 100-ml portions of n-decane.

The resulting solid catalyst component (16.7 g) had the following characteristics:
Shape and size of particles: fine powder, difficult to decant;
Titanium content: 15% by weight expressed as metal;
Ratio of trivalent titanium to sum of trivalent and tetravalent titanium: 0.95/1
The catalyst component contained the following as a percentage by weight:
Titanium: 15; magnesium: 3.3; aluminium: 2.4; chlorine: 27.3; organic fraction: 51.9.
The catalyst component can be defined by the following formula:

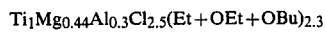

$Ti_1Mg_{0.44}Al_{0.3}Cl_{2.5}(Et+OEt+OBu)_{2.3}$

The following were introduced into the following order into an agitated 5-liter reactor:
1820 ml of anhydrous n-heptane, 0.68 g triethyl aluminium and 14 mg of the previously-mentioned solid catalyst component.

The reactor was heated to a temperature of 90° centigrade and pressurized with hydrogen to 3.8 atm. and then with ethylene to 9 atm. Ethylene was supplied for 4 hours, keeping the pressure at the stated value, after which the reaction was stopped by injecting 20 ml of an alcoholic solution of ionolo into the reactor.

The productivity was 15 and the yield was 100.

The resulting polyethylene had the following characteristics:
Melt index: 6.2 g/10
Shear sensitivity: 26
Density: 0.9623 g/ml
Physical form of polymer: heterogeneous powder, average diameter 160μ
Apparent density: 0.38 g/ml
Content of fines (<74μ) 6% by weight

EXAMPLE 6

The substrate used was prepared as described in Example 1.

2.45 g of the substrate were suspended in 50 ml n-decane in an agitated 250-ml reactor. 14 g of titanium tetra n-butylate were added and the mixture was heated to 80° centigrade for 60 minutes. It was then cooled to 30° centigrade and 15.6 g of diethyl aluminium chloride diluted in 50 g n-decane were added dropwise. In this example, therefore, the Mg/Ti atomic ratio was 0.5/1 and the ratio of chlorine atoms in diethyl aluminium chloride to alkoxy groups was 0.75/1. The mixture was heated to 60° centigrade for 120 minutes, and the solid was filtered on a sintered glass baffle and washed with three 100-ml portions of n-decane. The resulting solid catalyst component (13.5 g) had the following characteristics:
Shape and size of particular: similar to the substrate;
Titanium content: 14% by weight expressed as metal;
Ratio of trivalent titanium to the sum of trivalent and tetravalent titanium: 0.97/1
Surface area: 18 m²/g;
Porosity: 40% by volume.
The catalyst component contained the following: as a percentage by weight:
Titanium: 14.2; magnesium: 3.7; aluminium: 3.3; chlorine: 34; organic fraction: 45.
The catalyst component can be defined by the following formula:

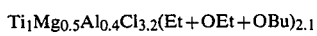

$Ti_1Mg_{0.5}Al_{0.4}Cl_{3.2}(Et+OEt+OBu)_{2.1}$

The following were introduced in the following order into an agitated 5-liter reactor: 1820 ml of anhydrous n-heptane, 0.68 g triethyl aluminium and 31 mg of the solid catalyst component as hereinbefore.

The reactor was brought to a temperature of 90° centigrade and pressurized with nitrogen to 3.6 atm. and then with ethylene to 9 atm. Ethylene was supplied for 4 hours, keeping the pressure at the stated value, after which the reaction was stopped by injecting 20 ml of an alcoholic solution of IONOLO into the reactor. The productivity was 18 and the yield was 130.

The resulting polyethylene had the following characteristics:
Melt index: 4.9 g/10
Shear sensitivity: 29.6
Density: 0.9618 g/ml
Physical form of polymer: free-flowing powder, average diameter 180μ
Apparent density: 0.39 g/ml
Content of fines (<74μ): 6% by weight

EXAMPLE 7

The substrate used was prepared as described in Example 1.

10 g of the substrate were suspended in 150 ml n-decane in an agitated 150-ml reactor. 9.7 g of titanium tetra n-butylate were added and heated to 50° centigrade for 60 minutes. The mixture was then cooled to 30° centigrade and 14.4 g diethyl aluminium chloride in 50 g n-decane were added dropwise.

In this example, therefore, the Mg/Ti atomic ratio was 3 and the ratio of chlorine atoms in diethyl aluminium chloride to alkoxy groups was 0.75/1.

The mixture was heated to 50° centigrade for 120 minutes, and the solid was filtered on a sintered glass baffle and washed with three 100-ml portions of n-decane.

The resulting solid catalyst component (16.8 g) had the following characteristics:
Shape and size of particles: similar to the substrate;
Titanium content: 8.1% by weight, expressed as metal;
Ratio of trivalent titanium to the sum of trivalent and tetravalent titanium: 0.95/1
Surface area: 23 m²/g;

Porosity: 58% by volume

The catalyst component contained the following, as a percentage by weight:

Titanium: 8.1; magnesium: 12.7; aluminium: 2.9; chlorine: 48.9; organic fraction: 29.

The catalyst component is definable by the following formula:

$Ti_1Mg_{3.1}Al_{0.63}Cl_{8.1}(Et+OEt+OBu)_3$

The following were introduced in the following order into an agitated 5-liter reactor: 1820 ml of anhydrous n-heptane, 0.68 g triethyl aluminium and 37 mg of the catalyst component as hereinbefore.

The reactor was brought to a temperature of 90° centigrade and pressurized with hydrogen to 3.8 atm. and then with ethylene to 9 atm. Ethylene was supplied for 4 hours, keeping the pressure at the stated value, after which the reaction was stopped by injecting 20 ml of an alcoholic solution of IONOLO into the reactor.

The productivity was 14 and the yield was 176.

The resulting polyethylene had the following characteristics:

Melt index: 4.2 g/10
Shear sensitivity: 27
Density: 0.9611 g/ml
Physical form of polymer: free-flowing powder, average diameter 220μ
Apparent density: 0.4 g/ml
Content of fines (<74μ): 6% by weight

EXAMPLE 8 (comparison)

The substrate used was prepared as described in Example 1.

10 g of the substrate was suspended in 150 ml n-decane in an agitated 500-ml reactor. 1.92 g of titanium tetra n-butylate were added and heated to 50° centigrade for 60 minutes. After cooling to 30° centigrade, 6.6 g of diethyl aluminium chloride diluted in 30 g n-decane were added dropwise. In this example, therefore, the Mg/Ti atomic ratio was 15 and the ratio of chlorine atoms in diethyl aluminium chloride to alkoxy groups was 0.75/1. The mixture was heated to 50° centigrade for 120 minutes, and the solid was filtered on a sintered glass baffle and washed with three 100-ml portions of n-decane. The resulting solid catalyst component (11.9 g) had the following characteristics:

Shape and size of particles: similar to substrate;
Titanium content: 2.3% by weight expressed as metal;
Ratio of trivalent titanium to the sum of trivalent and tetravalent titanium: 0.93/1

The catalyst component contained the following by weight:

Titanium: 2.3; magnesium: 18.9; aluminum 2; chlorine: 57.2; organic fraction: 19.6

The catalyst component can be defined by the following formula:

$Ti_1Mg_{16.6}Al_{1.54}Cl_{34}(Et+OEt+OBu)_{7.8}$

The following were introduced in the following order into an agitated 5-liter reactor: 1820 ml of anhydrous n-heptane, 0.68 g triethyl aluminium and 133 mg of the solid catalyst component as hereinbefore.

The reactor was raised to a temperature of 90° centigrade and pressurized with hydrogen to 3.8 atm. and then with ethylene to 9 atm. Ethylene was applied for 4 hours, keeping the pressure at the stated value, after which the reaction was stopped by injecting 20 ml of an alcoholic solution of IONOLO.

The productivity was 7 and the yield was 310.

The resulting polyethylene had the following characteristics:

Melt index: 4.3 g/10
Shear sensitivity: 29.6
Density: 0.9623 g/ml
Physical shape of polymer: free-flowing powder, average diameter 280μ
Apparent density: 0.38 g/ml
Content of fines (<74μ); 10.6% by weight

EXAMPLE 9 (comparison)

A substrate was prepared by operating in similar manner to Example 1 but the spray-drying conditions were adjusted so that the content of alcoholic hydroxyls was 10% by weight, expressed as ethanol.

5 g of the substrate were suspended in 100 g n-decane containing 5 ml titanium tetrachloride. The mixture was heated for 2 hours to 115° centigrade and cooled, and the solid was filtered and washed with n-decane. The resulting solid catalyst component had the following characteristics:

Shape and size of particles: similar to substrate;
Titanium content: 2.4% by weight, expressed as metal.

The catalyst component contained the following as a percentage by weight:

Titanium: 2.4; magnesium: 23.6; chlorine: 70; organic fraction: 4.0.

The catalyst component can be defined by the following formula:

$Ti_1Mg_{19.6}Cl_{39.5}(EtO)_{1.8}$

The following were introduced in the following order into an agitated 5-liter reactor: 1820 ml of anhydrous n-heptane 0.68 g triethyl aluminium and 37 mg of the catalyst component as aforementioned.

The reactor was brought to a temperature of 90° centigrade and pressurized with hydrogen to 4.5 atm. and then with ethylene to 9 atm. Ethylene was supplied for 4 hours, keeping the pressure at the stated value, after which the reaction was stopped by injecting 20 ml of an alcoholic solution of IONOLO.

The productivity was 12.8 and the yield was 400.

The resulting polyethylene had the following characteristics:

Melt index: 7.6 g/10
Shear sensitivity: 30
Density: 0.98650 g/ml
Physical form of polymer: free-flowing granules, average diameter about 400μ.
Apparent density: 0.32 g/ml
Content of fines (<74μ): 3% by weight
Fraction extractable with boiling n-heptane: 3.2% by weight The GPC data were as follows:
$Mw.10^{-3}=88$
$Mn.10^{-3}=13$
$Mz.10^{-3}=460$
$Mw/Mn: =6.8$

EXAMPLE 10 (comparison)

1.9 g of commercial magnesium chloride having a water content of 0.7% by weight and in the form of flakes from 0.1 to 2 mm in diameter (used in Example 1) were suspended in 50 ml n-decane in an agitated 250-ml reactor.

At ambient temperature (20°–25° centigrade), 0.6 g ethyl alcohol (25% by weight) and 7 g titanium tetra n-butylate were added.

The mixture was heated to 80° centigrade for 60 minutes. It was cooled to 30° centigrade and 8.3 g of diethyl aluminium chloride diluted in 35 g n-decane were slowly added. In this example therefore the Mg/Ti atomic ratio was 1/1 and the ratio of chlorine atoms in diethyl aluminum chloride to alkoxy groups was 0.75/1.

The mixture was heated to 60° centigrade for 30 minutes and filtered on a sintered glass filter. The solid was washed with three 100-ml portions of n-decane.

6.5 g of solid catalyst component were obtained with the following characteristics:
Shape and size of particles: heterogeneous powder;
Titanium content: 15.5% by weight expressed as metal;
Ratio of trivalent to the sum of trivalent and tetravalent titanium: about 1/1.

The catalyst component contained the following, as a percentage by weight:
Titanium: 15.5; magnesium: 5.7; aluminim: 1.2; chlorine: 36.4; organic fraction: 41.

The catalyst component can be defined by the formula:

$$Ti_1Mg_{0.74}Al_{0.14}Cl_{3.16}(Et+OEt+OBu)_{1.74}$$

The following were introduced in the following order into an agitated 5-liter reactor: 1820 ml of anhydrous n-heptane, 0.65 g triethyl aluminium and 22 mg of the solid catalyst component prepared as described hereinbefore.

The reactor temperature was raised to 90° centigrade and pressurized to 3.8 atm. with hydrogen and the pressure was brought to a total value of 9 atm. with ethylene.

The mixture was polymerized for 4 hours in a supply of ethylene, after which the reaction was stopped by injecting 20 ml of an alcoholic solution of IONOLO.

The productivity was 10 and the yield was 65 in the resulting polyethylene.

The polyethylene had the following characteristics:
Melt index: 5.0 g/10
Shear sensitivity: 27.3
Density: 0.9630
Physical form of polymer: heterogeneous powder, average particle size about 140μ.
Apparent density: 0.38 g/ml
Content of fines (<74μ): 20% by weight

I claim:
1. A catalyst component for polymerizing ethylene or copolymerizing ethylene with an alpha olefin comprising a spherical granular solid with at least 80% of said granules having a particle size of 30 to 40 microns, a surface area of 15 to 30 m²/g and a porosity of 40 to 80 volume % produced by the process comprising:
   (a) spray-drying an ethanolic solution of magnesium chloride to thereby form a solid granular spherical free-flowing substrate containing from 18 to 25% by weight of alcoholic hydroxyls expressed as ethanol;
   (b) suspending the substrate in an inert liquid to thereby form a suspension;
   (c) reacting the substrate with Ti(OR')₄ where R' denotes a straight-chain or branched alkyl group containing from 1 to 8 carbon atoms at a temperature between room temperature and 90° C., wherein the atomic ratio of magnesium in said magnesium chloride to titanium in said Ti(OR')₄ is from 0.5/1 to 3/1;
   (d) reacting the thus treated substrate with diethyl aluminium chloride or ethyl aluminum sesquichloride at a temperature between room temperature and 80° C. wherein the ratio of chlorine atoms in said diethyl aluminum chloride or ethyl aluminum sesquichloride to alkoxy groups in said Ti(OR')₄ and ethanol is in the range of from 0.5/1 to 1.5/1, to thereby obtain the solid catalyst component in which the ratio of trivalent titanium to the sum of trivalent and tetravalent titanium is in the range from 0.8/1 to 1.1; and
   (e) recovering said solid catalyst component from said reaction.

2. The catalyst component of claim 1 wherein the substrate contains from 23 to 25% by weight of alcoholic hydroxyls expressed as ethanol.

3. The catalyst component of claim 1 wherein the surface area is from 20 to 30 m²/g.

4. The catalyst component of claim 3 wherein the porosity is from 60 to 70 volume %.

5. The catalyst component of claim 4 wherein the ratio of trivalent titanium to the sum of trivalent and tetravalent titanium is from 0.9/1 to 1/1.

6. The catalyst component of claim 1 wherein the reaction between the substrate and Ti(OR')₄ is conducted at a temperature of 30° to 60° C.

7. The catalyst component of claim 6 wherein the atomic ratio of magnesium to titanium is from 0.8/1 to 1.5/1.

8. The catalyst component of claim 7 wherein the reaction between said treated substrate and diethyl aluminum chloride or ethyl aluminum sesquichloride is from 30° to 60° C.

9. The catalyst componet of claim 8 wherein the ratio of chlorine atoms to alkoxy groups is from 0.65/1 to 0.8/1.

10. The catalyst component of claim 9 wherein the ratio of trivalent titanium to the sum of trivalent and tetravalent titanium is 0.9/1 to 1/1.

11. The catalyst component of claim 10 wherein the component Ti(OR')₄ is titanium tetra n-butoxide.

12. The catalyst component of claim 1 further comprisiong a trialkyl aluminun contaning 2 to 6 carbon atoms in each alkyl group.

13. The catalyst component of claim 12 wherein the trialkyl aluminum is triethyl aluminum.

14. The catalyst component of claim 12 wherein the aromatic ratio of aluminum in the trialkyl aluminum to titanium in the spherical granular solid is from 50/1 to 200/1.

15. The catalyst component of claim 14 wherein said aluminum/titanium ratio is about 100/1.

* * * * *

UNITED STATES PATENT AND TRADEMARK OFFICE
CERTIFICATE OF CORRECTION

PATENT NO. : 4,843,049
DATED : June 27, 1989
INVENTOR(S) : Renzo Ivernizzi et al.

It is certified that error appears in the above-identified patent and that said Letters Patent is hereby corrected as shown below:

Column 14, line 51, "10" should read -- 1 --.

Column 14, line 54, "prisiong" should read -- prising --.

Column 14, line 59, "aromatic" should read -- atomic --.

In the cover sheet, add the name of the Assignee as follows.

-- ENICHEM ANIC S.p.A., Palermo, Italy --.

Signed and Sealed this

Fifth Day of June, 1990

*Attest:*

HARRY F. MANBECK, JR.

*Attesting Officer*      *Commissioner of Patents and Trademarks*